United States Patent [19]

Mashimo et al.

[11] 3,714,872
[45] Feb. 6, 1973

[54] PHOTOGRAPHIC FLASH EXPOSURE CONTROL SYSTEM

[75] Inventors: Yukio Mashimo, Meguro-ku, Tokyo; Seiichiro Mizui, Naka-ku, Yokohama-shi, Kanagawa-ken; Yoshiyuki Takishima, Kawasaki-shi, Kanagawa-ken, all of Japan

[73] Assignee: Canon Kabushiki Kaisha, Tokyo, Japan

[22] Filed: April 13, 1970

[21] Appl. No.: 27,699

[30] Foreign Application Priority Data

April 18, 1969 Japan..............................44/30113
June 20, 1969 Japan..............................44/48735
June 20, 1969 Japan..............................44/48736
June 6, 1969 Japan..............................44/53050

[52] U.S. Cl............95/10 CE, 250/214 P, 315/241 P
[51] Int. Cl......................G03b 15/05, H05b 41/02
[58] Field of Search..........95/10 C, 11 R, 11.5, 11 L, 95/10 CE; 250/214 P; 315/241 P

[56] References Cited

UNITED STATES PATENTS

| | | | |
|---|---|---|---|
| 2,901,671 | 8/1959 | Most | 95/11.5 R X |
| 2,946,924 | 7/1960 | Gerlach et al. | 315/241 P |
| 3,350,604 | 10/1967 | Erickson | 315/241 |
| 3,424,071 | 1/1969 | Schwahn | 95/11.5 |
| 3,438,766 | 4/1969 | Biber | 95/11 |
| 3,470,798 | 10/1969 | Mikakawa | 95/10 |

Primary Examiner—John M. Horan
Assistant Examiner—Fred L. Braun
Attorney—Anton J. Wille

[57] ABSTRACT

A camera system comprises a flash device cooperative with a auto-flash mechanism in a camera. The flash device comprises a capacitor, a power supply circuit for charging the capacitor and a discharge lamp circuit including a discharge lamp. The flash device is further provided with a control circuit connected between the capacitor and the auto-flash mechanism for detecting the charge stored in the capacitor and providing output signal to control the auto-flash mechanism in the camera to obtain the optimum exposure.

15 Claims, 11 Drawing Figures

PHOTOGRAPHIC FLASH EXPOSURE CONTROL SYSTEM

The present invention relates generally to a flash device and a camera system having the flash device and more particularly a flash device cooperative with an auto-flash mechanism of a camera and a camera system having the flash device.

For exposure with the use of a flash device, a value obtained by dividing a guide number by a distance between a subject and the flash device is set as a stop value. A mechanism for automatically setting a stop value for flash exposure is known as disclosed in U.S. Pat. No. 3,344,724. In one auto-flash mechanism as disclosed in U.S. Patent application Ser. No. 820,988, filed May 1, 1969, now U.S. Pat. No. 3,633,476, and U.S. Ser. No. 820,901, filed May 1, 1969, now U.S. Pat. No. 3,613,534, the focusing ring of a camera is cooperative with an aperture setting ring; a guide number of a flash device is set by an auto-flash switching ring on the side of the camera for setting the guide number; and a variable or adjustable resistor cooperative with the focusing ring is connected to the electric eye (EE) circuit in the camera having a auto-flash mechanism, thereby determining a stop value by an angle of deflection of a pointer of a meter. For flash exposure, the guide number of the flash device is generally considered constant when a suitable stop value or exposure factor is determined. When a flash device having no circuit for automatically maintaining constant a voltage charged across a main capacitor of the flash device, under-exposure tends to occur because of an insufficient charging of the main capacitor.

An object of the present invention is to provide a flash device and a camera system having this flash device in which a voltage charged across a main capacitor of the flash device is detected by use of the auto-flash mechanism of the camera and a meter such as an exposure meter of the auto-flash-mechanism is so controlled as to automatically obtain the optimum exposure.

According to one aspect of the present invention, an operator can view through a viewfinder a signal representative of the completion of the flash device ready for flash exposure for example by the deflection of the pointer of a meter within the viewfinder.

According to another aspect of the present invention, the auto-flash mechanism is automatically controlled depending upon the power source voltage or luminescence of the flash device so that even when the power voltage is varied, it can be suitably compensated, thereby obtaining the optimum exposure all the time.

According to another aspect of the present invention, the variation in voltage across the main capacitor of the flash device is indicated by the deflection of the pointer of a meter, whereby flash exposure can be accomplished at a desired stop value or aperture.

According to another aspect of the present invention, a control unit or circuit is interposed between the flash device and the auto-flash mechanism in such a manner that a low voltage output is in proportion to a high power source voltage of the flash device, thereby matching one to the other in a best manner.

According to another aspect of the present invention, a flash device having a control unit or circuit and a camera having a auto-flash mechanism are constructed as separate, independent units in such a manner that when the flash device is attached to the camera, flash exposure becomes possible by an extremely simple operation. Furthermore, it is very simple to switch between flash exposure and exposure without the use of a flash bulb. When the flash device is detached from the camera, exposure without use of the flash bulb may be obtained without special manipulations. Thus, it is seen that the camera construction is not further complicated by the present invention.

The present invention will become more apparent from the following description of the preferred embodiments thereof taken in conjunction with the accompanying drawings, in which.

It should be noted that throughout the drawings the same components will be shown with the same reference numerals or characters.

Figure 1:
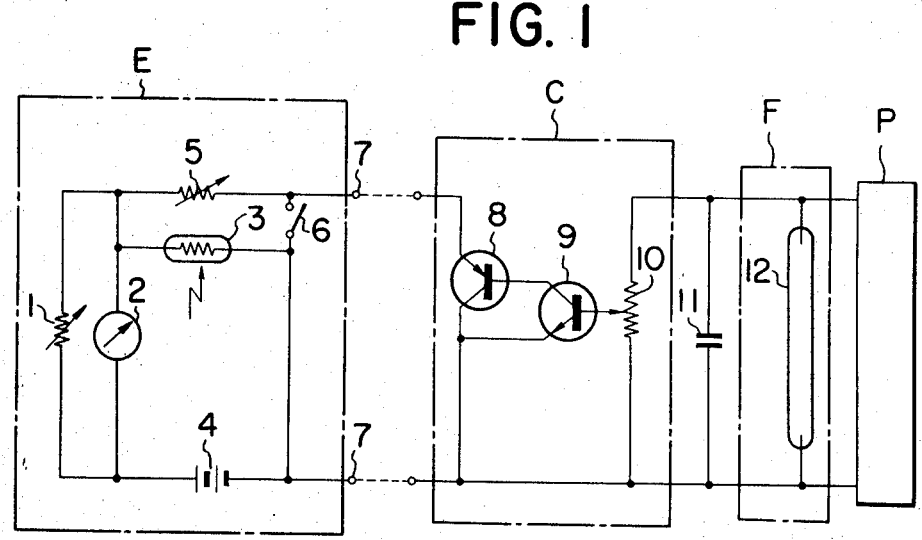
FIG. 1 is a circuit diagram, with block diagram in part, illustrating a flash device and an EE circuit of a camera in accordance with the invention.

Referring to FIG. 1 illustrating a circuit diagram of flash device and an EE circuit in accordance with the present invention, the EE circuit E comprises a variable resistor 1, and the variable resistor 1 is connected in parallel with an ammeter 2 and is adapted to be adjusted in accordance with the sensitivity of the film and the guide number. The stop value of a photo lens is automatically set in accordance with the indication by a pointer of ammeter 2 as being well known in the art. A photoconductive element 3 such as cadmium sulphide (CdS) is connected in series to a power source 4.

Reference numeral 5 designates a variable resistor whose resistance is varied in response to the angle of rotation of a focusing ring; 6, a switch; and 7 and 7, terminals for connection of the EE circuit with the flash device. A flash device comprises a main capacitor 11, a discharge lamp circuit F including gas discharge lamp 12, a power supply circuit P including a battery, and a control circuit C including a potentiometer 10 for dividing a voltage across main capacitor 11 and transistors 8 and 9.

Next the mode of operation will be described. In case of daylight photography, switch 6 is opened and a suitable aperture for a given subject-brightness is determined by the EE circuit. In the case of a flash exposure with a flash bulb whose guide number is constant, switch 6 is closed so as to couple variable resistor 5 to the EE circuit, whereby the auto-flash mechanism is established for flash exposure. When the flash device in accordance of the present invention is coupled to the camera for flash exposure, switch 6 remains opened while the power switch (not shown) of the flash device is closed, whereby main capacitor 11 is charged. The energy stored in the capacitor is expressed by $CV^2/2$ which is proportional to the guide number. Thus, the voltage across capacitor 11 is detected so as to control the auto-flash mechanism, whereby the latter may be actuated by the brightness of the flash device which is ready to flash. More specifically, a fraction of the voltage across capacitor 11 is applied by potentiometer 10 from its moving arm to the base electrode of NPN transistor 9 whose collector is connected to the base of PNP transistor 8. The emitter and collector of PNP transistor 8 are connected to auto-flash mechanism or EE circuit E so that the deflection of the pointer of meter 2 varies depending upon the charged voltage across capacitor 11. When the voltage across capacitor 11 is small, the collector current is less so that the pointer of meter 2 deflects through a small angle.

On the other hand, when the voltage across capacitor 11 is high, the pointer deflects through a large angle, indicating the stop-in. When potentiometer 10 is so adjusted that a predetermined guide number may be indicated when the voltage across capacitor 11 reaches a predetermined value, the guide number of the flash devices is varied accordingly. Thus, the deflection of pointer of the meter 2 is also varied accordingly so that the flash exposure can be made with a suitable or optimum exposure factor. In order to indicate the fact that the voltage charged across main capacitor 11 reaches a minimum voltage which can start flashing of flash lamp 12, a meter on the side of the camera may be used. In this case, this meter may be so arranged as to be viewed in the field of the rangefinder, whereby an operator can continuously and advantageously carry out flash exposures without leaving his eye from the viewfinder, that is, from the subjects to be photographed.

Figure 2:
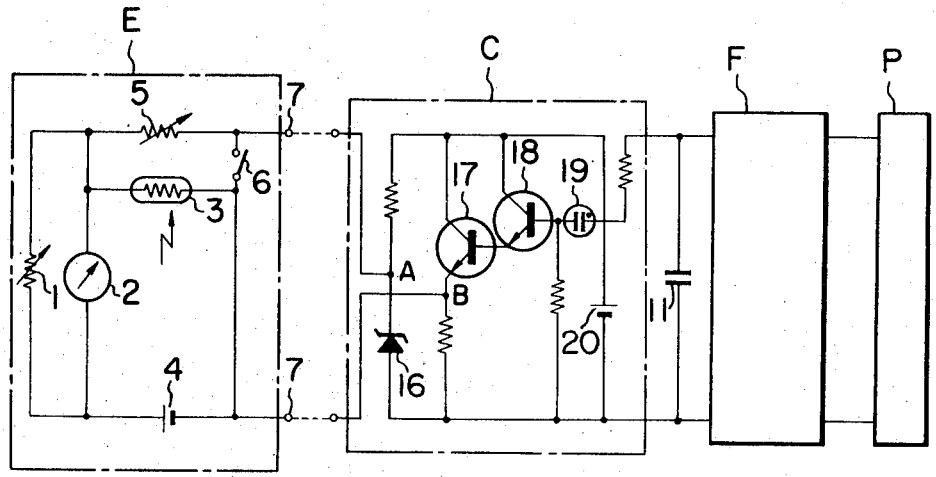
FIG. 2 is a circuit diagram, schematic in part illustrating another embodiment in accordance with the invention.

Next, the second embodiment of the present invention will be described with reference to FIG. 2. Instead of potentiometer 10 as in the first embodiment shown in FIG. 1, a bias voltage having the polarity opposite to that of the power source (not shown) in power circuit P is applied so as to vary in response to a voltage charged across main capacitor 11 in order to control the current flowing through the EE circuit, that is, to control the deflection of the pointer of the meter 2.

In control circuit C of the second embodiment, a Zener diode 16 is interconnected for obtaining a constant voltage, and an NPN transistor 17 has its base connected to the emitter of an NPN transistor 18 whose base is connected to a neon discharge lamp 19. 20 designates a bias source, as set forth above. When the voltage across main capacitor 11 of the flash device is less than the minimum voltage for initiating the flashing of flash lamp 12 (see FIG. 1), neon discharge lamp 19 is not ignited so that both of the transistors 17 and 18 remain in the non-conductive state. A voltage across the output terminals A and B is substantially equal to that of bias source 20. When the voltage across the main capacitor 11 rises above the minimum voltage for initiating the flashing of the flash lamp, neon discharge lamp 19 is ignited so that both of the transistors 17 and 18 are rendered conductive. Therefore, the polarity at the output terminals A and B are reversed so that the pointer of the meter 2 defects through a certain angle, whereby the operator can recognize the fact that the flash device is ready to flash at any moment.

When the voltage across capacitor 11 is further raised, the voltage across the terminals A and B is also increased accordingly so that the exposure factor for flash exposure may be automatically determined by EE circuit E.

From the foregoing it is seen that even when the guide number of the flash device is deviated from a reference value due to the voltage charged across main capacitor 11, the EE circuit may be controlled accordingly, thereby accomplishing the flash exposure with a suitable exposure factor. Furthermore, the operator can see through the viewfinder the sign representative of the completion of readying the flash device for flashing, thus ensuring proper flash exposure in a very effective and simple manner.

Because of the operating range and rise time characteristic of a transistor, the operating range of the flash device is sometimes not sufficient. The embodiments illustrated in FIGS. 3 and 5 contemplate eliminating this defect, thereby providing the flash device which can be actuated in a positive manner even at a lower voltage. Thus, the embodiments of the present invention incorporate therein an improved transistorized control circuit.

Figure 3:
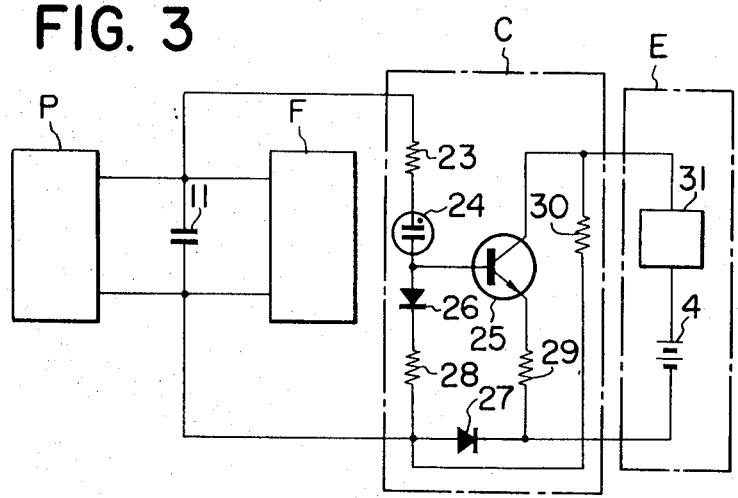
FIG. 3 is a circuit diagram, with block diagram in part, of a third embodiment of the present invention.

Referring to FIG. 3, there is shown a direct step-up circuit employing transistors used as a power supply circuit for the flash device. 11 is a main capacitor, and F, a discharge lamp circuit including a trigger circuit. A control circuit C includes a series resistor 23, a neon discharge lamp 24, a transistor 25, diodes 26 and 27 and resistors 28, 29 and 30. E is the auto-flash mechanism of the camera.

Figure 4:
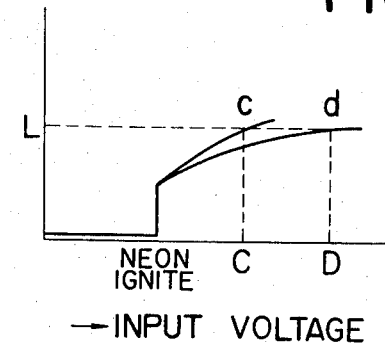
FIG. 4 is a graph for explanation of the mode of operation of the present invention.

FIG. 4 is for explanation of the mode of operation of the instant embodiment, illustrating the relation between a voltage across main capacitor 11 and a current flowing through a load or auto-flash mechanism E. Upon closure of a power switch (not shown) of the flash device, main capacitor 11 is charged by the charging current from the power circuit P.

When the voltage across main capacitor 11 reaches the minimum voltage capable of initiating the flashing of the discharge lamp in discharge lamp circuit F, neon discharge lamp 24 is ignited so that the current flows from the base to the emitter of the transistor 25, whereby the load current as shown in FIG. 4 flows through the output circuit. Assuming that only resistor element is interconnected in the base circuit of the transistor, then the load current is shown by curve c in FIG. 4 and the voltage across the main capacitor 11 becomes C when the pointer of the meter in the load circuit indicates the maximum or critical value L. However, when diode 26 is interconnected in the base circuit as shown in FIG. 3, the input voltage to the transistor is "compressed" due to the nonlinearity thereof so that the load current is shown by curve d in FIG. 4. Thus, when the meter indicates the maximum or critical value L, the voltage across main capacitor 11 becomes D. This means that the operating range of the EE circuit due to the voltage across main capacitor 11 is widened. In the instant embodiment, diode 27 is interconnected so as to interrupt the input current of the transistor as shown in FIG. 3, so that the circuit may have a high input impedance. Furthermore, bias resistor 30 is employed. Thus, the rise time characteristic of the transistor is improved so that the positive switching action can be ensured when the neon discharge lamp is triggered.

Figure 5:
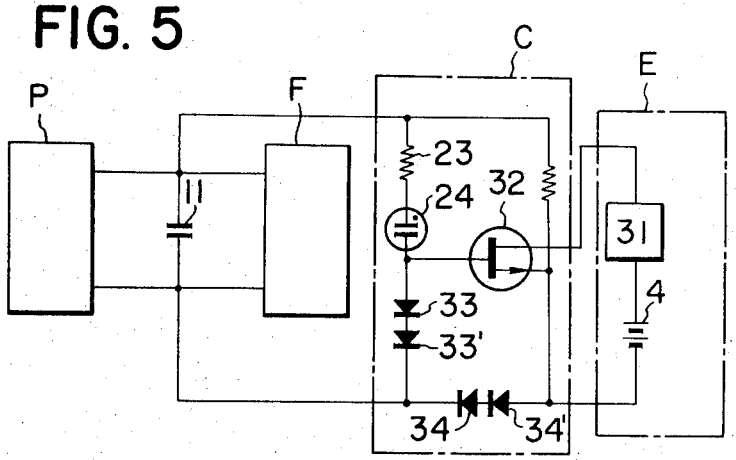
FIG. 5 is a circuit diagram of a fourth embodiment of the present invention.

The fourth embodiment illustrated in FIG. 5 employs a field effect transistor 32 in the control circuit. When FET 32 is used, it is no longer required to improve the rise time characteristic of the transistor. It is just interconnected to diodes 33 and 33' for "compression" of the input voltage. Diodes 34 and 34' are interconnected for obtaining a bias voltage for FET 32.

In the instant embodiment, the control range of the auto-flash mechanism or EE circuit due to the voltage across main capacitor 11 may be widened. The more positive operation can be ensured and the more effective design of the flash device becomes possible.

Figure 6:
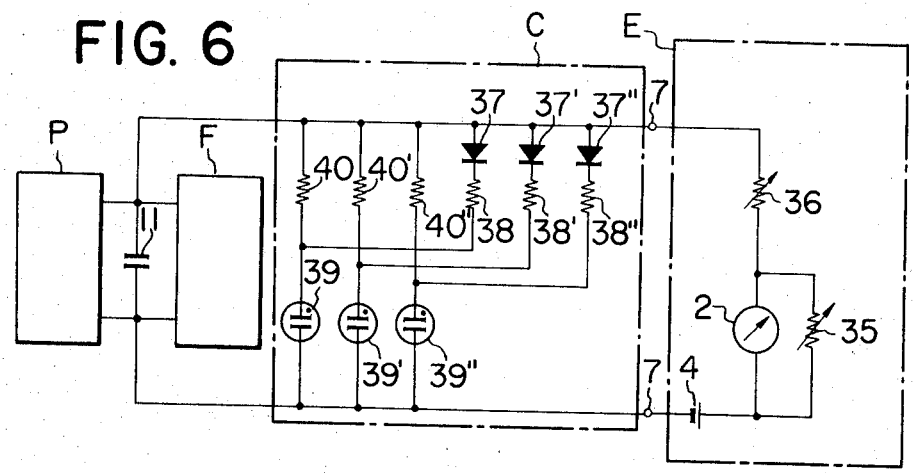
FIG. 6 is a circuit diagram of a fifth embodiment of the present invention.
Figure 7:
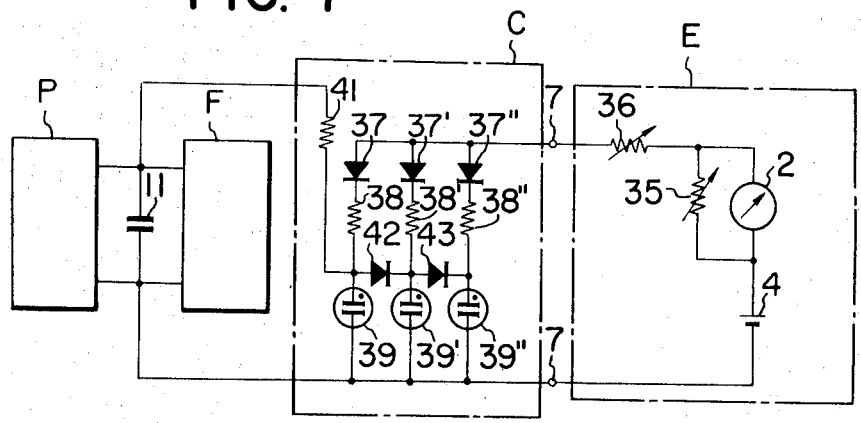
FIG. 7 is a circuit diagram of a sixth embodiment of the present invention.

The fifth and sixth embodiments illustrated in FIGS. 6 and 7 are so arranged to automatically determine the optimum exposure factor in cooperation with the auto-flash mechanism of a camera system having a flash device for flash exposure and more particularly the EE camera. In EE circuit E, a resistor 35 for setting the sensitivity of the film to be used is interconnected in parallel with ammeter 2 and a resistor 36 for setting the range in case of flash exposure is also interconnected in the circuit. 4 is a battery of the EE circuit and 7 and 7, the terminals for coupling the camera to the flash device. The above components are arranged in the camera.

In FIG. 6, the control circuit C of the flash device includes diodes 37, 37' and 37'' connected in parallel with one another, resistors 38, 38' and 38'' connected in series with diodes 37, 37' and 37'' respectively, neon discharge lamps 39, 39' and 39'' connected in series to these resistors respectively; and resistors 40, 40' and 40'' connected in series thereto respectively. 11 designates a main capacitor of the flash device; F, the discharge lamp circuit; and P, the power supply circuit for flash device.

When the power switch (not shown) in the power supply circuit P is closed, capacitor 11 is charged by the current from the power supply circuit P. When the voltage charged across the main capacitor 11 reaches the minimum voltage capable of initiating the flashing of any one of the discharge lamps in the discharge lamp circuit, the resistor 40 is so connected that the first neon lamp 39 is turned on.

A certain current flows through the diode 37 and the resistor 38 by the switching action of the neon lamp 39 so that the pointer of the meter 2 of the EE circuit deflects through a certain angle. When the shutter release button is released under this condition, the exposure is made through an aperture which is determined in response to the angle through which the pointer of the meter deflects. Thereafter, when the voltage charged across the main capacitor 11 reaches a predetermined voltage level, the neon lamp 39' is turned on so that the circuit elements, that is the diode 37' and the resistor 38' are connected to the EE circuit so that the current flowing through the circuit elements 37 and 38 and the current flowing through the circuit elements 37' and 38' flow through the EE circuit. Thus, the pointer of the meter 2 deflects more. When the neon discharge lamp 39'' is turned on, all of the currents flowing through the branched circuits each consisting of the diode, the resistor and, the neon lamp flow through the EE circuit, whereby the pointer of the meter 2 is deflected more and more.

In order that the neon discharge lamps 39, 39' and 39'' are turned on sequentially, the values of the resistors 40, 40' and 40'' are suitably selected. Thus, the voltage charged across main capacitor 11 may be detected in steps or digitally, whereby the pointer of the meter in the EE circuit is deflected. Since diodes 37, 37' and 37'' are connected in the direction as shown in FIG. 6, the current from battery 4 in the EE circuit is permitted to flow through the meter.

The sixth embodiment illustrated in FIG. 7 is a variation of the fifth embodiment shown in FIG. 6.

When a resistor 41 is employed as shown in FIG. 7, instead of resistors 40, 40' and 40'' as in FIG. 6, and diodes 42 and 43 are interconnected as shown in FIG. 7, neon lamps 39, 39' and 39'' are also turned on sequentially in response to the rise of the voltage charged across main capacitor 11 by varying the voltages for triggering the lamps. It should be noted that instead of the neon lamps, thyristors or any other suitable switching elements can be employed for attaining the same function.

Figure 8:
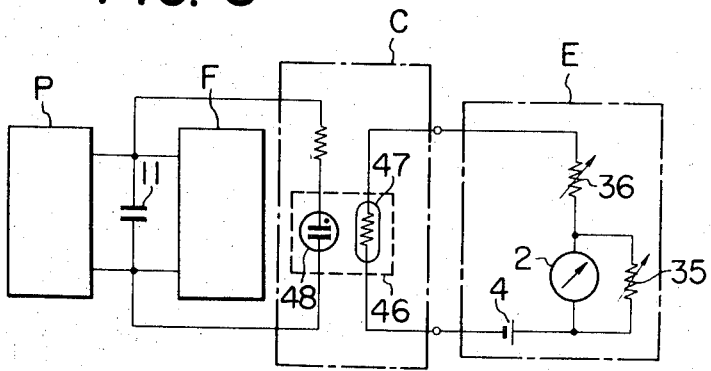
FIG. 8 is a circuit diagram of a still another embodiment of a flash device and a camera system having this flash device in accordance with the invention.
Figure 9:
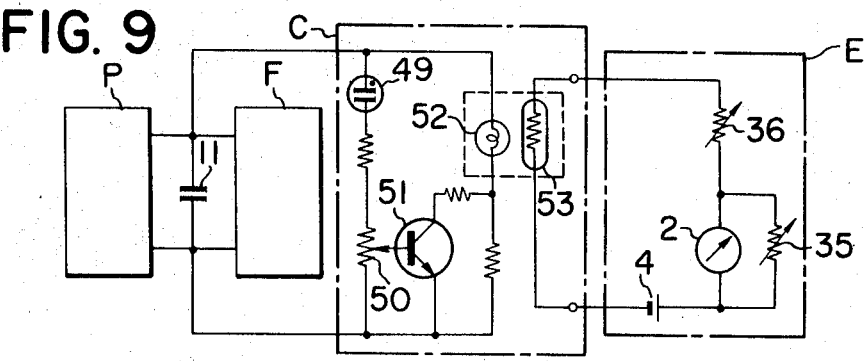
FIG. 9 is a circuit diagram of a still another embodiment in accordance with the present invention.
Figure 10:
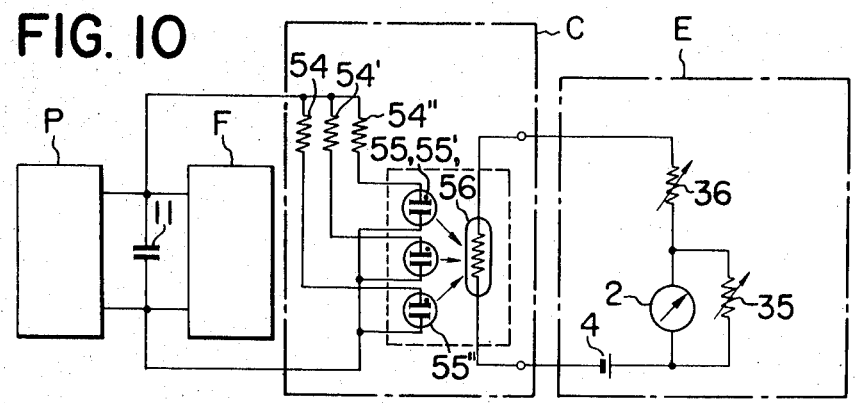
FIG. 10 is a circuit diagram of a still another embodiment of the invention.

The embodiments illustrated in FIGS. 8, 9 and 10 are so arranged to detect the voltage across the main capacitor of the flash device by use of the EE circuit incorporated in the camera, thereby controlling the EE circuit by the variation in resistance of a photoconductive element disposed in opposed relation with a light source whose luminescence varies, whereby the optimum exposure may be attained automatically in response to the angle of deflection of the pointer of the ammeter.

FIG. 8 is a circuit diagram of a camera system having the flash device in accordance with the present invention. E designates the EE circuit, and a control circuit C includes a light source 48 such as a neon discharge lamp disposed in opposed relation with a photoconductive element 47. A main capacitor is designated by 11; a power circuit, by P; and a discharge lamp circuit including a trigger circuit, by F. When the voltage across the capacitor 11 reaches a minimum voltage which can initiate the flashing of the discharge lamp, neon lamp 48 is turned on and the light therefrom is intercepted by photoconductive element 47. Thus, it is readily seen that the resistance of photoconductive element 47 is varied in response to a voltage across main capacitor 11. Both of terminals of the photoconductive elements 47 are connected to the EE circuit in the camera so as to control the current flowing through the EE circuit.

Therefore, the optimum exposure can be accomplished automatically in response to the deflection of pointer of the ammeter 2 as in the case of the conventional EE camera. In the instant embodiment, the luminescence of the flash device is detected from a small light source and converted into the variation in resistance of the photoconductive element disposed in opposed relation with the light source so that the flash device is not electrically coupled to the EE circuit in the camera. This latter feature of the instant embodiment should be particularly noted.

FIG. 9 illustrates the eighth embodiment of the present invention. E designates the EE circuit in the camera which comprises ammeter 2, variable resistors 35 and 36 for setting the sensitivity of the film to be used and setting the range or distance, and battery 4 of the EE circuit. 11 designates a main capacitor of the flash device; P, a power circuit; F, a discharge lamp circuit including a trigger circuit; and C a control circuit including neon lamp 49, potentiometer 50, NPN transistor 51 and photo-coupler consisting of miniaturized lamp 52 and a photoconductive element 53. Main capacitor 11 is charged by the current from the power source of the flash device. When the voltage across main capacitor 11 reaches the minimum voltage capable of initiating the flashing, neon discharge lamp 49 is turned on and transistor 51 is rendered conductive by the voltage divided by potentiometer 50, whereby lamp 52 is turned on. The light from lamp 52 is intercepted by photoconductive element 53 disposed in opposed relation therewith so that the resistance of photoconductor element 53 is varied in response to a voltage across main capacitor 11.

The circuit is coupled to the EE circuit in the camera as shown so as to control the current flowing therethrough, whereby the optimum exposure can be attained automatically in response to the deflection of the pointer of the ammeter 2.

FIG. 10 illustrates still another embodiment of the present invention comprising power circuit P, discharge lamp circuit F and control circuit C. The control circuit includes a photo-coupler consisting of a group of neon lamps 55, 55' and 55'' connected in parallel and photoconductive element 56 in opposed relation therewith for intercepting the light emanating therefrom, and resistors 54, 54' and 54'' connected in series to the neon lamps respectively as shown. The voltage across capacitor 11 may be detected in steps by neon discharge lamps 55, 55' and 55'' whose light is in turn detected by photoconductive element 56, whereby the voltage across capacitor 11 may be detected as the variation in resistance of photoconductive element 56. Thus, the EE circuit in the camera may be controlled so that the deflection of the pointer of ammeter 2 may be varied in steps.

In the embodiments described hereinabove with reference to FIGS. 8, 9 and 10 the EE circuit can be controlled by the voltage across main capacitor 11 through photo-coupler means consisting of a neon discharge lamp or lamps and a photoconductive element disposed in opposed relation therewith. Thus, the EE circuit is not electrically coupled to the flash device so that the design and use of the flash device in accordance with the present invention are much facilitated. Furthermore, the EE function can be attained by a simple circuit even when flash exposure is made.

Figure 11:
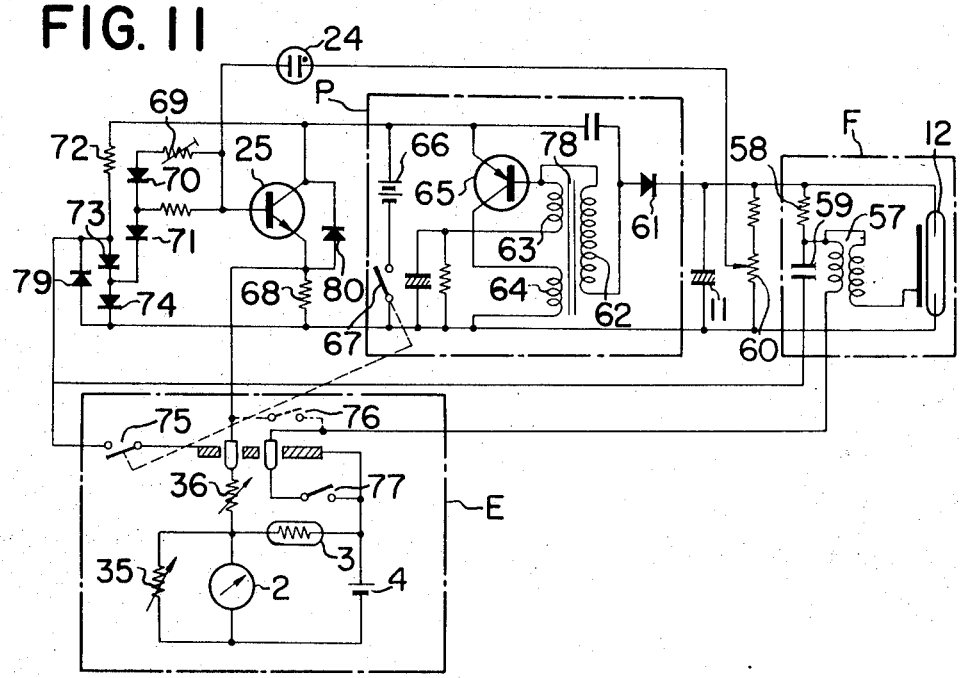
FIG. 11 is a circuit diagram of one example of practical flash device and auto-flash mechanism of camera to which is attached the flash device.

Next referring to FIG. 11, a highly detailed circuit in accordance with the present invention will be described for better understanding of the present invention.

Reference numeral 65 refers to a transistor for oscillation and interconnected to primary 64 and the feedback winding 63 of a transformer 78; 62, the secondary of transformer 78 is connected through rectifier element 61 to main discharge capacitor 11; and F, a discharge circuit including trigger coil 57, resistor 58 for charging trigger capacitor 59, and flash lamp 12. Discharge circuit F is coupled to flash synchronization terminal 77 of the EE circuit E in the camera. A control circuit includes variable resistor 60 connected in parallel with main capacitor 11, neon discharge lamp 24, diodes 70, 71 and 74 and transistor 25. The control circuit further includes emitter resistor 68 of transistor 25, variable resistor 69 for correcting the voltage drop across emitter resistor 68, diode 73 for obtaining a constant voltage and bias resistor 72 for applying a predetermined voltage across diodes 73 and 74. Diodes 70, 71 and 74 serve to "compress" the variation in voltage across the main capacitor 11 and to compensate for the rise time of the voltage across the base and emitter of transistor 25.

Switch 75 is interlocked with power switch 67 of the flash device in such a manner that when power source 66 of the flash device is turned off, the EE circuit in the camera is disconnected from the control of the flash device. Auto-flash mechanism E in the camera includes ammeter 2 cooperable with an aperture, photoconductive element 3, variable resistor 35 connected in parallel with ammeter 2 for setting the sensitivity of the film and power source 4. Variable resistor 36 is interlocked with a focusing ring. Switch 76 serves to safeguard against electric shock and is opened when the flash device is attached to the camera and closed when detached, so as to short-circuit the high-voltage terminal for flash syncronization to a lower voltage level.

Reference numeral 80 designates a diode for protecting diodes 73 and 74 and transistor 25 from the reverse voltage.

The mode of operation is as follows. First the flash device is attached to the camera and power switch 67 is turned on so that switch 75 coacting with power switch 67 is closed, whereby the voltage across diodes 73 and 74 (for example 1.3V) is applied in the direction so as to cancel voltage 4 (for example, the mercury battery with 1.3V) of the EE circuit. In this case, it should be noted that the pointer of ammeter 2 is not deflected.

As soon as switch 67 is closed, the DC-DC converter consisting of circuit elements 61, 62, 63, 64 and 65 is energized so that the high voltage induced across secondary 62 is applied through rectifier 61 to main discharge capacitor 11, whereby the latter is charged. When main capacitor 11 is charged to a predetermined level for initiating the flashing, neon discharge lamp 24 is rendered conductive so that transistor 25 is also rendered conductive in a switch-like fashion. Therefore, a voltage drop (for example, 0.8V) occurs across emitter resistor 68 so that the voltage applied to the EE circuit in the reverse direction drops from 1.3V to 0.5V, whereby the pointer of the ammeter indicates a guide number, in jumping fashion, corresponding to the voltage across capacitor 11.

As the voltage across main capacitor 11 is increased, the voltage drop across emitter resistor 68 is increased, the voltage applied in the reverse direction to the EE circuit is reduced and then the current flow through ammeter 2 increases. When the voltage across main capacitor 11 reaches the peak voltage, the voltage drop across emitter resistor 68 becomes approximately equal to that across diodes 73 and 74 (for example, 1.3V) so that the reverse voltage applied to the EE circuit becomes zero.

Ammeter 2 indicates this accordingly.

Upon focusing adjustment, variable resistor 36 cooperating therewith varies its resistance so as to control the current flowing through the ammeter. For example, if the distance between the flash device and a subject is relatively small, the resistance of variable resistor 36 is low so that much current flows through ammeter 2 whereby the diaphragm is closed. On the other hand, when the distance is relatively large, less current flows through the ammeter so that the diaphragm is opened accordingly. That is, the nearer the subject, the more the diaphragm is closed. Upon depression of the shutter button, flash synchronization switch 77 is closed in synchronism with the actuation of the shutter blades or the like and the trigger pulse is induced across the secondary of trigger coil 78 for triggering discharge lamp 12. When discharge lamp 12 is triggered the charge stored in main discharge capacitor 11 is discharged through the lamp, thereby flashing the light for exposure. Neon lamp 24 is rendered non-conductive and the voltage drop across emitter resistor 68 becomes zero so that the voltage for cancelling the power source voltage is applied to the EE circuit and the pointer of the ammeter will not deflect at all. Thus, the next flash exposure cycle is ready to start.

Having thus described the invention, it will be apparent to those skilled in the art that various modifications can be made within the spirit and scope of the present invention. For example, in the conventional EE camera, the shutter button is generally locked when the pointer of the ammeter does not deflect or does deflect beyond a predetermined value. This warning system may be also used for indication of the operating range of the flash device. When switch 67 is opened, switch 75 cooperating therewith is also opened so that the camera may be under the control of the EE circuit even when the flash device is attached thereto.

What is claimed is:

1. A flash exposure control system for a camera comprising:
    a capacitor; a power supply circuit coupled to said capacitor for charging said capacitor; a discharge circuit including a discharge lamp coupled to said capacitor; and exposure meter circuit including an exposure meter; and control circuit means operatively coupled between said capacitor and said exposure meter circuit for producing an output control signal for controlling the deflection of said exposure meter in response to variations in the charge stored in said capacitor.

2. A flash exposure control system as set forth in claim 1, wherein said control circuit means comprises at least one switching element coupled to said capacitor and responsive to a predetermined voltage across said capacitor to produce said output control signal.

3. A flash exposure control system as set forth in claim 2, wherein said switching element comprises a neon discharge lamp which conducts when the voltage across said capacitor reaches a predetermined level.

4. A flash exposure control system as set forth in claim 2, wherein said circuit control means further comprises: photo-coupler means including light emissive means coupled to said switching element, and light responsive means coupled to said exposure meter, said photo-coupler becoming energized in response to the energization of said switching element for producing said output control signal.

5. A flash exposure control system as set forth in claim 1, wherein said control circuit means comprises: a plurality of switching elements, each connected in parallel with said capacitor for respectively switching to a conductive state in response to mutually different predetermined charge levels of said capacitor; and a plurality of signal conducting means, coupled one each to said plurality of switching elements and to said exposure meter, and each becoming energized in response to the said switching to a conductive state of the respective switch element coupled thereto.

6. A flash exposure control system as set forth in claim 1, wherein said control circuit means includes a detecting circuit for detecting the voltage across said capacitor, and a voltage source connected to said detecting circuit in an opposed-polarity relationship with respect to the polarity of said voltage across said capacitor.

7. A flash exposure control system as set forth in claim 1 and further comprising:
    constant voltage means for providing a constant voltage reference portion of said output control signal.

8. A flash exposure control system as set forth in claim 1, wherein said control circuit means comprises a photo-coupler including: at least one light emissive means coupled to said capacitor; and light responsive means coupled to said exposure meter for producing said output control signal.

9. A flash exposure control system as set forth in claim 1, wherein said control circuit means comprises a photo-coupler including: a plurality of light emissive means, and a plurality of resistors, wherein each light emissive means is series connected with a resistor across said capacitor; and a plurality of light responsive means optically coupled respectively to said plurality of light emissive means, and each coupled to said exposure meter for producing said output control signal.

10. A flash exposure control system for a camera as set forth in claim 1, in which said control circuit means includes diode circuit means for providing a non-linear output control signal for increasing the response range of said exposure meter with respect to said variations in charge stored in said capacitor.

11. A flash exposure control system for a camera as set forth in claim 1, in which said control circuit means comprises a detecting circuit for detecting the voltage across said capacitor, and semiconductor circuit means coupled between said detecting circuit and said exposure meter for producing said output control signal in response to variations of the said voltage detected by said detecting circuit.

12. A flash exposure control system for a camera as set forth in claim 11, in which said semiconductor circuit means includes diode circuit means for providing a non-linear output control signal for increasing the response range of said exposure meter with respect to said voltage variations across said capacitor.

13. A flash exposure control system for a camera as set forth in claim 1, in which said control circuit means includes switching means for applying said output control signal to said exposure meter to control said deflection of said meter to indicate a non-optimum value when said charge on said capacitor is below a predetermined level.

14. A flash exposure control system for a camera as set forth in claim 13, in which said switching means includes a plurality of voltage sensitive switching devices to control said deflection in steps corresponding to a plurality of predetermined charge levels on said capacitor.

15. A flash exposure control system for a camera, as set forth in claim 1, in which said control circuit means includes potentiometer means coupled to said capacitor for providing manual adjustments to said output control signal.

* * * * *

UNITED STATES PATENT OFFICE
CERTIFICATE OF CORRECTION

Patent No. 3,714,872              Dated February 6, 1973

Inventor(s) YUKIO MASHIMO, SEIICHIRO MIZUI, and YOSHIYUKI TAKISHIMA.

It is certified that error appears in the above-identified patent and that said Letters Patent are hereby corrected as shown below:

Column 2, line 47, after "of" insert --a--;

Column 3, line 47, change "leaving" to --removing--;

Column 4, line 1, after "both" delete "of the";

Column 7, lines 28-29, "photoconductor" should read --photoconductive--;

Column 9, line 54, change "and" to --an--.

Signed and sealed this 10th day of July 1973.

(SEAL)
Attest:

EDWARD M. FLETCHER, JR.              Rene Tegtmeyer
Attesting Officer                    Acting Commissioner of Patents